United States Patent
Kulkarni et al.

(10) Patent No.: US 9,846,476 B1
(45) Date of Patent: Dec. 19, 2017

(54) SYSTEM AND METHOD OF IDENTIFYING THE IDLE TIME FOR LAB HARDWARE THRU AUTOMATED SYSTEM

(71) Applicant: EMC IP Holding Company LLC, Hopkinton, MA (US)

(72) Inventors: Gururaj Kulkarni, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 14/755,012

(22) Filed: Jun. 30, 2015

(51) Int. Cl.
*G06F 1/32* (2006.01)
*G06F 9/44* (2006.01)
*G06F 9/50* (2006.01)

(52) U.S. Cl.
CPC .......... *G06F 1/3246* (2013.01); *G06F 1/3287* (2013.01); *G06F 9/442* (2013.01); *G06F 1/32* (2013.01); *G06F 1/3203* (2013.01); *G06F 1/3206* (2013.01); *G06F 1/3209* (2013.01); *G06F 9/5011* (2013.01); *G06F 2209/508* (2013.01); *G06F 2209/5019* (2013.01); *Y02B 60/1282* (2013.01)

(58) Field of Classification Search
CPC ........ G06F 1/32; G06F 1/3206; G06F 1/3203; G06F 1/329; G06F 1/26; G06F 1/3209; G06F 1/3287; G06F 2209/5019; G06F 2209/508; G06F 9/5011; Y02B 60/144; Y02B 60/1282
See application file for complete search history.

(56) References Cited

U.S. PATENT DOCUMENTS

| | | | |
|---|---|---|---|
| 2002/0178387 A1* | 11/2002 | Theron | G06F 1/32 713/300 |
| 2004/0024853 A1* | 2/2004 | Cates | G06F 8/67 709/223 |
| 2005/0102674 A1* | 5/2005 | Tameshige | G06F 9/5011 718/100 |
| 2005/0149940 A1* | 7/2005 | Calinescu | G06F 9/5061 718/104 |
| 2006/0047979 A1* | 3/2006 | Hsu | G06F 1/30 713/300 |
| 2011/0035533 A1* | 2/2011 | Doh | G06F 1/3209 711/102 |
| 2011/0283119 A1* | 11/2011 | Szu | G06F 1/26 713/300 |
| 2012/0065802 A1* | 3/2012 | Seeber | G06F 1/3203 700/295 |
| 2012/0144219 A1* | 6/2012 | Salahshour | G06F 1/3203 713/322 |
| 2013/0274942 A1* | 10/2013 | Rees | G06F 1/3206 700/295 |

* cited by examiner

Primary Examiner — Terrell Johnson
(74) Attorney, Agent, or Firm — Staniford Tomita LLP

(57) ABSTRACT

A centralized monitoring server communicates with a system administrator through a mobile application and agent programs running on server machines that monitor the idle status of the server machines and storage arrays. When a server machine and/or storage array are idle, the centralized monitoring server can instruct the agent program to shutdown the server machine and/or storage array. The centralized monitoring server can also startup the server machine and/or storage array when needed. In an embodiment, the system administrator can control the shutdown and startup instructions. By shutting down server machines and/or storage arrays energy efficiency can be significantly improved.

17 Claims, 6 Drawing Sheets

SYSTEM AND METHOD OF IDENTIFYING THE IDLE TIME FOR LAB HARDWARE THRU AUTOMATED SYSTEM

TECHNICAL FIELD

Embodiments are generally directed to computer storage systems, and more specifically to identifying idle times methods for computer storage systems.

BACKGROUND

Data center hosts include multiple servers, storage arrays, switches and other hardware equipment. The size of the data center hosts can range from a few hundreds to few thousands hardware machines. Many of the hardware machines in the storage arrays in lab environment can be idle. While the idle may reduce the energy consumed by the machines, energy is still required to maintain the idle state. In order to save energy, most storage arrays in lab environments can go through a manual shutdown process on weekends when fewer machines are needed. However, there are currently no systems that are available for a centralized server or a portal to automatically monitor and identify hardware equipment idle times and no methods are currently available for providing auto shutdown and bringing up of storage machines that are controllable through a centralized system.

What is needed, therefore, is a system that includes a centralized server that can monitor and identify hardware storage machines that are idle and automatically performing a shutdown process during detected idle time and subsequently an automated startup process when the hardware is needed.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
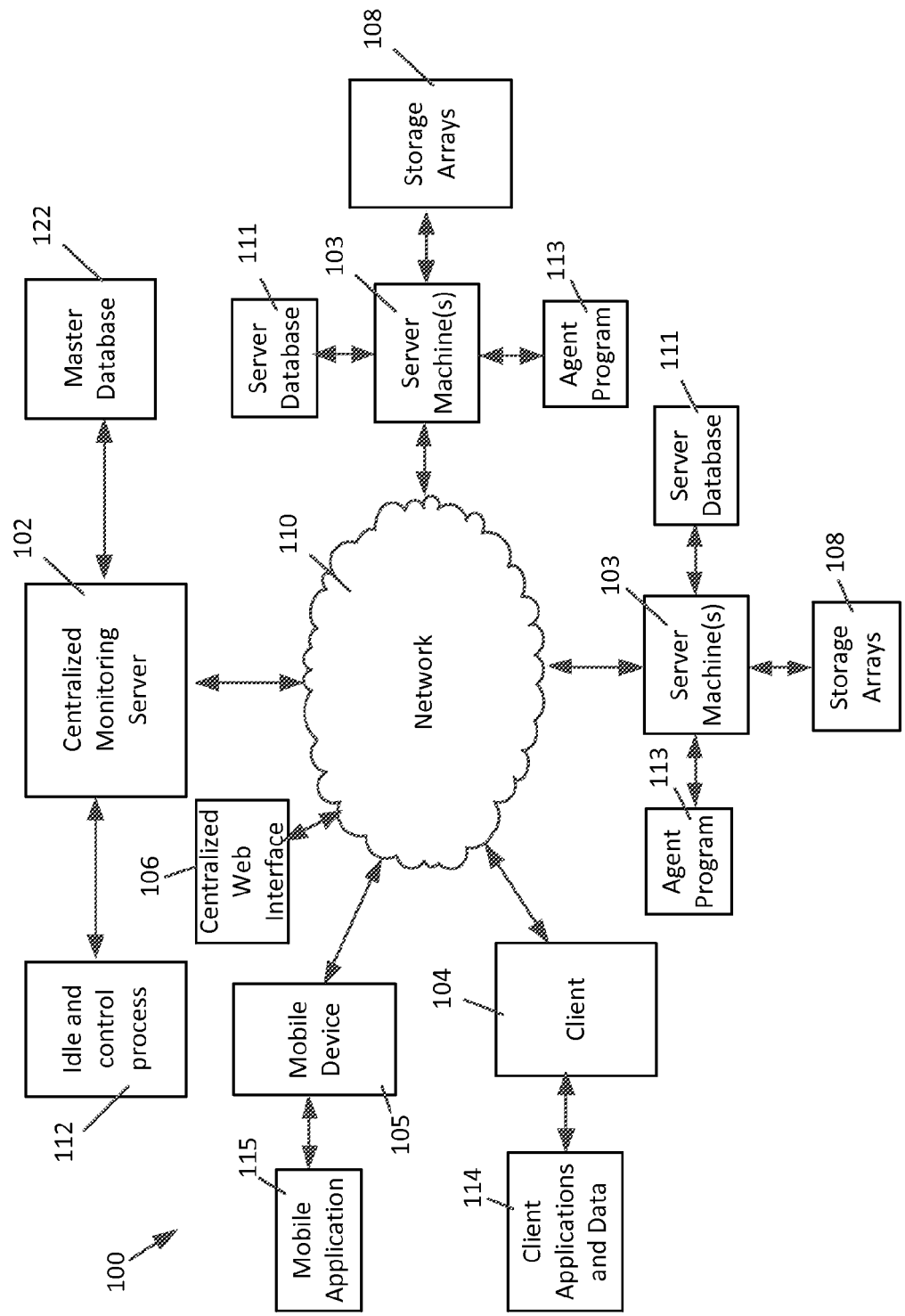
FIG. 1 is a diagram of a networked computer system that implements an automated method of determining idle times for server machines and storage arrays, under some embodiments.

A detailed description of one or more embodiments is provided below along with accompanying figures that illustrate the principles of the invention. While the invention is described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the present invention is not unnecessarily obscured.

It should be appreciated that the embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hard-wired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of performing idle detection using analytic processes and components. Some embodiments of the invention involve automated determination of optimum methods for detecting idle states in a distributed system, such as a client-server network, local area network (LAN), wide area network (WAN) or larger scale computer network system; however, those skilled in the art will appreciate that the invention is not limited thereto. Thus, aspects of the one or more embodiments described herein may be implemented on one or more computers executing software instructions, and the computers may be networked in a client-server arrangement or similar distributed computer network.

The present invention is directed towards a system and method used to save energy by identifying the storage machine idle time and performing auto shutdowns of the storage machines during detected idle times. The present invention may also have the ability to identifying when equipment idle time needs manual intervention from a system administrator. Hardware machine systems in a data center can vary from few hundreds to few thousands depending on size of data center, Many of the system hardware machines in storage arrays can be idle a substantial amount of any day. In general, the idle time of hardware equipment can be about 25-30% at low usage times of the day. Thus, a significant amount of energy could be saved if these idle machines are shutdown rather than left in idle states. For example, a facility such as a server farm may have 1,000 hardware machines that cycle between active and idle status during most of the day from 6 AM to 10 PM. However, during an 8 hour night time period from 10 PM to 6 AM, the system usage can be 25% lower. Thus, 25% of the servers are in an idle state.

In an embodiment of the present invention, agent programs can run on the servers and detect when the servers are idle. The agent program can transmit status information for the server machines and storage arrays to a centralized monitoring server. The centralized monitoring server can analyze the status information and determine that 250 of the server machines and storage arrays are idle at 10 PM. In an embodiment, the centralized monitoring server can review historical idle information for the servers and know that a 25% idle rate at 10 PM is normal for a week day based upon stored historical server idle data. The centralized monitoring server can transmit instructions to the 250 idles server machines and storage arrays to shutdown for 8 hours starting at 10 PM.

The centralized monitoring server can also know that at 6 AM, the 250 server machines and storage arrays will be needed based upon historical idle information stored in the central database. Before 6 AM the centralized monitoring server can restart the 250 server machines and storage arrays which can then resume normal operations by 6 AM. The startup process can be an automated or a manual method based upon the types of server machines and storage arrays used in the system. This process can repeat at 10 PM the next day. In some cases, the server usage may change the weekends based upon historical use data, By changing the server states from idle to shutdown could save about 24% of the energy normally consumed when the 250 servers are normally in an idle state.

FIG. 1 illustrates a computer network system 100 that implements one or more embodiments. In system 100, a centralized monitoring server 102 is coupled directly or indirectly, to one or more network server machines 103 coupled to storage arrays 108, client computers 104, mobile devices 105 and through a network 110. The network interface between the centralized monitoring server 102 and the server machines 103, client computers 104, mobile devices 105 and storage arrays 108 may include one or more routers that serve to buffer and route the data transmitted between the server and client computers. Network 110 may be the Internet, a Wide Area Network (WAN), a Local Area Network (LAN), or any combination thereof. Network 110 thus provides connectivity to the various systems of FIG. 1 and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform.

A client computer(s) 104 in system 100 may be a workstation computer or a computing device such as a notebook computer, personal digital assistant, thin network client device, or the like. The client computers 104 may be coupled to the server machine(s) 103 and storage arrays 108 over a wired connection, a wireless connection or any combination thereof that make up at least a portion of network 110. Each client 104 may run its own respective applications 113 to generate and process data through various client processes. In an embodiment, one or more clients 104 may be virtual clients, such as in a multi-tenant network in which a server 103 runs a single instance of a program serving multiple clients (tenants) 104 in which the program is designed to virtually partition its data so that each client works with its own customized virtual application.

An embodiment the centralized monitoring server 102 can run an idle and control process program 112 that communicates with a software or firmware program 113 running on each of the hardware server machines 103 and storage arrays 108. The centralized monitoring server 102 can host an Internet portal which can have a type of hardware, name, serial number and IP address. The Internet network 110 can be used to connect the centralized monitoring server 102 to server machines 103 and storage arrays 108 through agent programs 113 as well as a mobile app 115 on mobile devices 105, a secure centralized web interface 106 or other system administrator computers.

In an embodiment, a system administrator can log into a secure centralized web interface 106 which can be password protected. The centralized web interface 106 can provide a user interface through which the system administrator can perform the same functions as the mobile app 115. Thus, the centralized web interface 106 can provide another means for controlling the system when the mobile app 115 is not available.

The agent app 113 can be an operating system specific agent app or alternatively the agent app that can run on a computer operating system such as Windows or UNIX operating system computers. In other embodiments, the agent app can be a firmware application that can run on a storage array operating system such as VNX flare, VMAX Enguinity, etc. In an embodiment, these agent apps 113 can leverage the native operating system tools running on the server or storage array to capture the idle time. The agent app may also capture the virtualization information and can use the VMware Elastic Sky X (ESX) command line interface (CLI) utility to capture the virtual machine idle time. The ESX is an enterprise-class, type-1 hypervisor developed by VMware for deploying and serving virtual computers that includes and integrates operating system components. The agent apps 113 on the server machines 103 may not necessarily maintain a database for storing the idle times. However, the server machines 103 can have a small storage which could be file system storage to store the idle time data. Thus, the agent apps 113 can monitor and record the idle times of one or more server machines 103 and/or storage arrays 108. The agent app 113 can record and maintain the idle time information into a user or firmware database associated with the server machines 103 and/or storage arrays 108 hardware.

The agent apps 113 run on each server 103 that communicates with the centralized monitoring server 102 and the agent apps 113 send the idle time information to the centralized monitoring server 102. For the storage arrays 108, the centralized monitoring server 102 can the storage arrays 108 using a CLI utility and the idle time information can be fetched from the agent app 113. The centralized monitoring server 102 can keep the server machine and/or storage array idle time information can be stored on the master database 122. The centralized monitoring server 102 can continuously request the idle time information from the agent apps 113 to keep the information updated. In an embodiment, the idle time information can be updated based upon regular probe time information requests from the agent apps 113. These hardware server machines 103 and storage arrays 108 can keep updating the centralized server 102 about their idle status through the agent programs 113. The idle time information for each of the server machines 103 can be stored on server databases 111 and a master database 122. The master database 122 can store the data for all hardware server machines 103 and storage arrays 108 being monitored and their idle time data. This stored data can be used to generate historical idle time trends that can be used to made server machine 103 and/or storage array 108 shutdown recommendations.

The agent programs 113 can probe the server machines 103 using the system APIs or commands such as "uptime" or "w" commands which give the idle times for the storage machines 103. The uptime command can provide a measure of the time that a machine has been working and is available. The command "w" can provide a summary of every use logged into a computer and determine the load that the user activity is imposing on the server machine 103. For storage arrays 108, the agent programs 113 running on the server machine 103 that is managing the storage array 108 can use an equivalent storage array command to probe the storage array 108 idle time. In alternative embodiments, other probing approaches can include checking resource utilization which could be below a predetermined "lower water mark." For example, if CPU and memory utilization of server machine 103 and/or storage array 108 has not exceeded say 1% and 1 GB over an 8-hour period, then these machines could be considered to be idle. The values 1% and 1 GB are only examples of idle status numbers. In other embodiments, users can define these threshold values based on server and storage type.

FIG. 1 illustrates an environment where idle hardware states can be monitored and detected and automated shutdown controls for hardware machines in idle states can be implemented, in accordance with some embodiments. The client applications 114 are used to generate and send requests to applications executing in server machine(s) 103. One or more of the server machine(s) 103 may represent a web and/or application servers that execute applications capable of performing tasks requested by the client 104 users. The applications 114 may perform tasks on data maintained internally or externally and send the result to the clients 104. It should be noted that different modules of the same application may be deployed and executed on different systems within system 100. As illustrated by FIG. 1, there may be any number of clients 104 and any number of servers 103 and storage arrays 108.

The data generated within system 100 may be stored in any number of server machines 103 and network storage arrays 108. In an embodiment network 100 may be implemented to provide support for various storage architectures such as storage area network (SAN), Network-attached Storage (NAS), or Direct-attached Storage (DAS) that make use of large-scale network accessible storage devices 108, such as large capacity tape or drive (optical or magnetic) arrays. In an embodiment, the target storage devices, such as tape or disk array 108 may represent any practical storage device or set of devices, such as tape libraries, virtual tape libraries (VTL), fiber-channel (FC) storage area network devices, and OST (OpenStorage) devices.

In different embodiments, the central monitoring server 102 monitors the idle status of the server machines 103 and storage arrays 108. The central monitoring server 102 can store the idle information for the server machines 103 and storage arrays 108 in a master database 122. The idle status information can be recorded over a period of time and historical idle information can be analyzed. The idle and control process 112 program can allow the central monitoring server 102 to perform various tasks based upon the analysis of the stored idle information. For example, if the server machines 103 and storage arrays 108 historically becomes idle during weekends and evenings, the central monitoring server 102 can control automatic shutdown of the server machines 103 and storage arrays 108. The central monitoring server 102 can also detect and/or predict when the server machines 103 and storage arrays 108 and bringing up the server machines 103 and storage arrays 108 that have been shutdown.

In an embodiment a mobile communication device(s) 105 can also communicate with the centralized monitoring server 102, hardware server machines 103 and storage arrays 108 through the network 110. In an embodiment, the mobile device 105 running a mobile application 115 can be associated with or operated by a system administrator who can receive status information for the server machines 103 and storage arrays 108. Based upon the idle status information received by the mobile device 105, the system administrator may also be able to remotely control the shutdown and startup of the server machines 103 and storage arrays 108 through the centralized monitoring server 102.

In different embodiments, if the centralized web server 102 determines that the server machines 103 and/or storage arrays 108 are idle for more than a predetermined user specified idle time or if resource utilization is consistently below predetermined watermark idle levels, then a centralized web server 102 can issue the native operating system or storage commands to shutdown such as "shutdown". The server machine 103 and/or storage array 108 can respond to the command by shutting down. Thus, the shutdown of the server machine 103 and/or storage array 108 can be an automatic process.

Startup can be automatic if the server machine 103 or storage array 108 is a virtual machine which can leverage a Virtual Center or ESXi APIs to start the server machine 103 or storage array 108 automatically. For example, in a VMware system a "Distributed Resource Group cluster" can exist and many virtual machines can be part of the Distributed Resource Group cluster. User can set the limits and reserve resources for these virtual machines thru policies. If any of the pre-allocated resources are exceeded on these virtual machine(s) then required action can get triggered and that required action could be a shutdown or a migration of the virtual machine. Similarly in the illustrated embodiments, a centralized web server 102 can define the policy with possible predetermined threshold values of 5% or a time period of 8 hours as idle time indicators. The agent program 113 can probe the server machines 103 for their idle times and if any of the idle times exceeds either of the predetermined threshold values then the agent program 113 can trigger the automatic shutdown of such server machines 103.

In some embodiments, the centralized web server 102 may not be able to startup the server machine 103 and/or storage array 108 in a completely automatic process. For example, some hardware machine startups may require manual intervention or a hard reboot of the server machine 103 or storage array 108 to perform the startup process. In these embodiments, the centralized web server 102 may inform a system administrator that manual startup steps must be performed at a specific time based upon the predicted or detected system usage. In these embodiments, the startup process can be considered to be semi-automatic because some manual interaction with the server machine 103 and/or storage array 108 might be required depending upon the existing hardware operation requirements.

Figure 2:
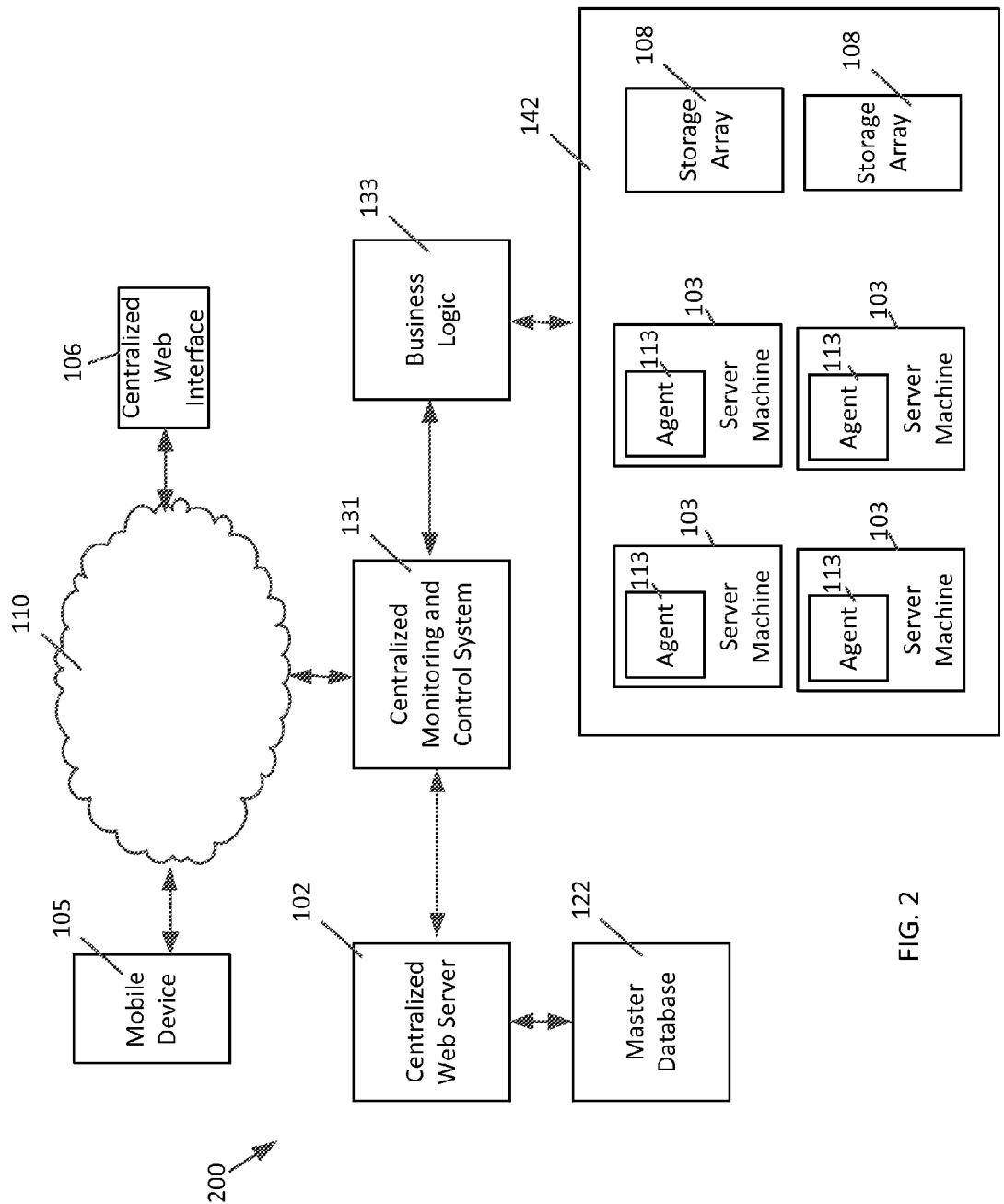
FIG. 2 is a diagram of a networked computer system that implements an automated method of determining idle times for server machines and storage arrays, under some embodiments.

FIG. 2 illustrates another system 200 where idle hardware states can be monitored and detected by a centralized web server 102. In this embodiment, the centralized web server 102 can communicate with a centralized monitoring control system 131 which can communicate with a business logic system 133. The centralized monitoring will provide an end user the details about servers, storage arrays with their IP and serial numbers. The centralized monitoring control system 131 can probe respective server machine 103 and/or storage array 108 thru the agents 113 as discussed above.

The business logic 133 can communicate with and control agent programs 113 running on a plurality of server machines 103. The agent programs 113 can be a software application or firmware which allows the status of the servers 103 and storage arrays 108 to be determined and communicated back to the business logic 133. The idle status of the storage arrays 108 can be transmitted back to the centralized web server 102 and stored on the master database 122 creating a historical record of idle times for the system. This historical information can be used for predicting optimum times during each day for shutting down and starting up the servers 103 and storage arrays 108. As discussed, the optimum shutdown or startup times can be based upon the time, date, weekday, weekend, holiday and other factors or information that would alter system usage. In different embodiments, the centralized web server 102 can determine the proper times to shutdown or startup the servers 103 and storage arrays 108. The control signals can be transmitted through the centralized monitoring and control system 131 and the business logic 133 to the agents 113 running on the servers 103. The agents 113 can then cause the servers 103 and storage arrays 108 to shutdown or startup.

Figure 3:
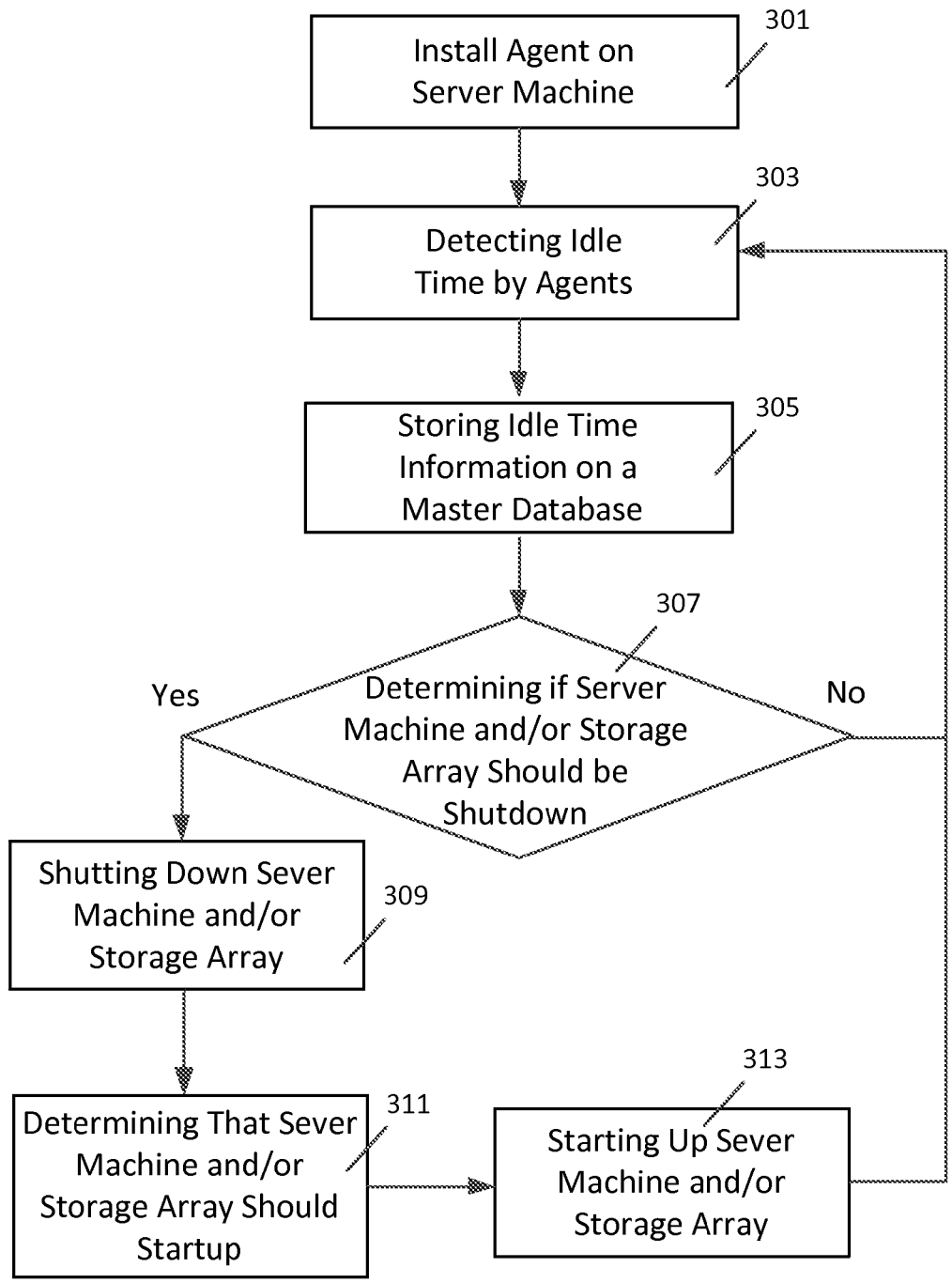
FIG. 3 illustrates a flowchart for an embodiment of a method for automatic detection and shutdown of idle server machines and storage arrays.

Various different process sequences can be performed to automatically shutdown the servers 103 and storage arrays 108. hardware machines in idle states can be implemented, in accordance with some embodiments. With reference to FIG. 3, a flow chart is illustrated showing an embodiment of process steps for performing shutting down and starting up the server machines and/or storage arrays. Agent programs can be installed on the server machines 301. The agents can monitor and detect the idle times of the server machines and/or storage arrays 303. The idle time information can be stored on a master database 305.

The centralized web server can determine if each of the idle servers and storage arrays should be shutdown 307. This determination can be based upon past historical idle information stored on the master database, the time of day, the date, weekend, week day, holiday, etc. If the server machines and/or storage arrays should not be shutdown then the process can go back to detecting the idle time by the agents 303. However, if the centralized web server determines that any of the idle server machines and/or storage arrays should be shutdown, instructions to shutdown can be sent to the agents associated with each of the servers and storage arrays that have been designated for shutdown. The agents can respond to the instructions by shutting down the server machines and/or storage arrays 309.

The centralized web server can determine or predict when the server machines and/or storage arrays should be started up based upon the monitoring of the other server machines and/or storage arrays and the historical idle data stored in the master database 311. In an embodiment, the startup demand can be based upon existing status and recent monitoring of the server machines and/or storage arrays that are not shutdown. For example, if an increasing number or percentage (95% or more) of server machines and/or storage arrays are transitioning from idle to active, this can indicate a trend towards more demand for server machines and/or storage arrays. This can be a sign that additional server machines and/or storage arrays may be needed soon and should be started up. Conversely, if an increasing number of server machines and/or storage arrays are being placed into idle, this can indicate a decreasing demand and additional server machines and/or storage arrays can be shutdown. The historical trends can also be used to predict the proper startup times for the server machines and/or storage arrays.

Before the server machines and/or storage arrays that have been shutdown are needed, the centralized web server can transmit startup instructions to the agents in the server machines. The agents can respond to the startup instructions by starting up the server machines and/or storage arrays 313. As discussed, the server machines and/or storage arrays may require manual intervention to startup. In these embodiments, the centralized web server may notify a system administrator through a mobile app, a secure centralized web interface, email, SMS or any other electronic communications methods when the server machines and/or storage arrays need to be started up. Once the server machines and/or storage arrays have been started up, they can go into an idle state before they become active and are used by client computers. After the server machines and/or storage arrays have been started up the agents can again monitor and detect the idle times 303.

Figure 4:
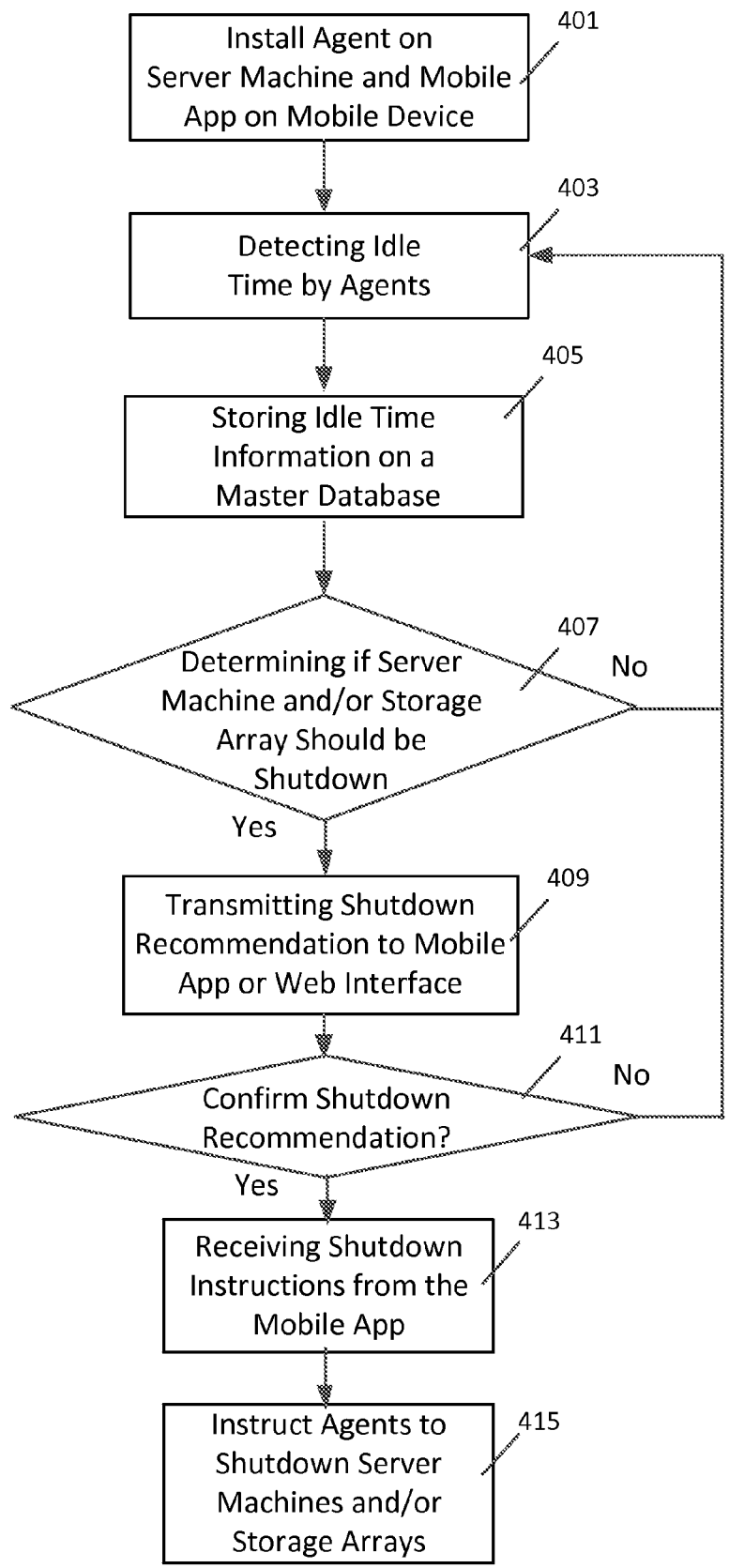
FIG. 4 illustrates a flowchart for an embodiment of a method for automatic idle detection and authorized shutdown of server machines and storage arrays through a web-interface or a mobile app on a mobile device.

With reference to FIG. 4, in another embodiment the shutdown and/or startup controls for the server machines and/or storage arrays can include a mobile application running on a mobile device associated with a system administrator and/or a secure centralized web interface. The mobile application (app) can allow the system administrator to control the shutdown and possibly startup for the server machines and/or storage arrays. Agent programs can be installed on the server machines and the mobile app can be installed on the mobile device 401. The agents can monitor and detect the idle times of the server machines and/or storage arrays 403. The idle time information can be stored on a master database 405. The centralized web server can determine if each of the idle servers and storage arrays should be shutdown 407 and if the server machines and/or storage arrays should not be shutdown then the process can go back to detecting the idle time by the agents 403.

If the centralized web server determines that any of the idle server machines and/or storage arrays should be shutdown, a recommendation to shutdown the idle server machines and/or storage arrays can be sent to the mobile app on the mobile device or a secure centralized web interface 409. The system administrator can review the recommendation and any other information needed to authorize the shutdown of the idle server machines and/or storage arrays. Based upon this information, the system administrator can either confirm or deny the shutdown recommendation 411. If the shutdown recommendation is denied, the system can return to monitoring the idle time by the agents 403. If the shutdown is confirmed, the centralized web server can receive the shutdown instructions from the mobile app or the secure centralized web interface 413. In some embodiments, the shutdown instructions may include instructions for each of the idle server machines and/or storage arrays. Thus, the authorization to shutdown can be for some but not all of the idle server machines and/or storage arrays. The centralized web server can instruct the agents to shutdown the idle server machines and/or storage arrays authorized by the system administrator through the mobile app or secure centralized web interface 415.

Figure 5:
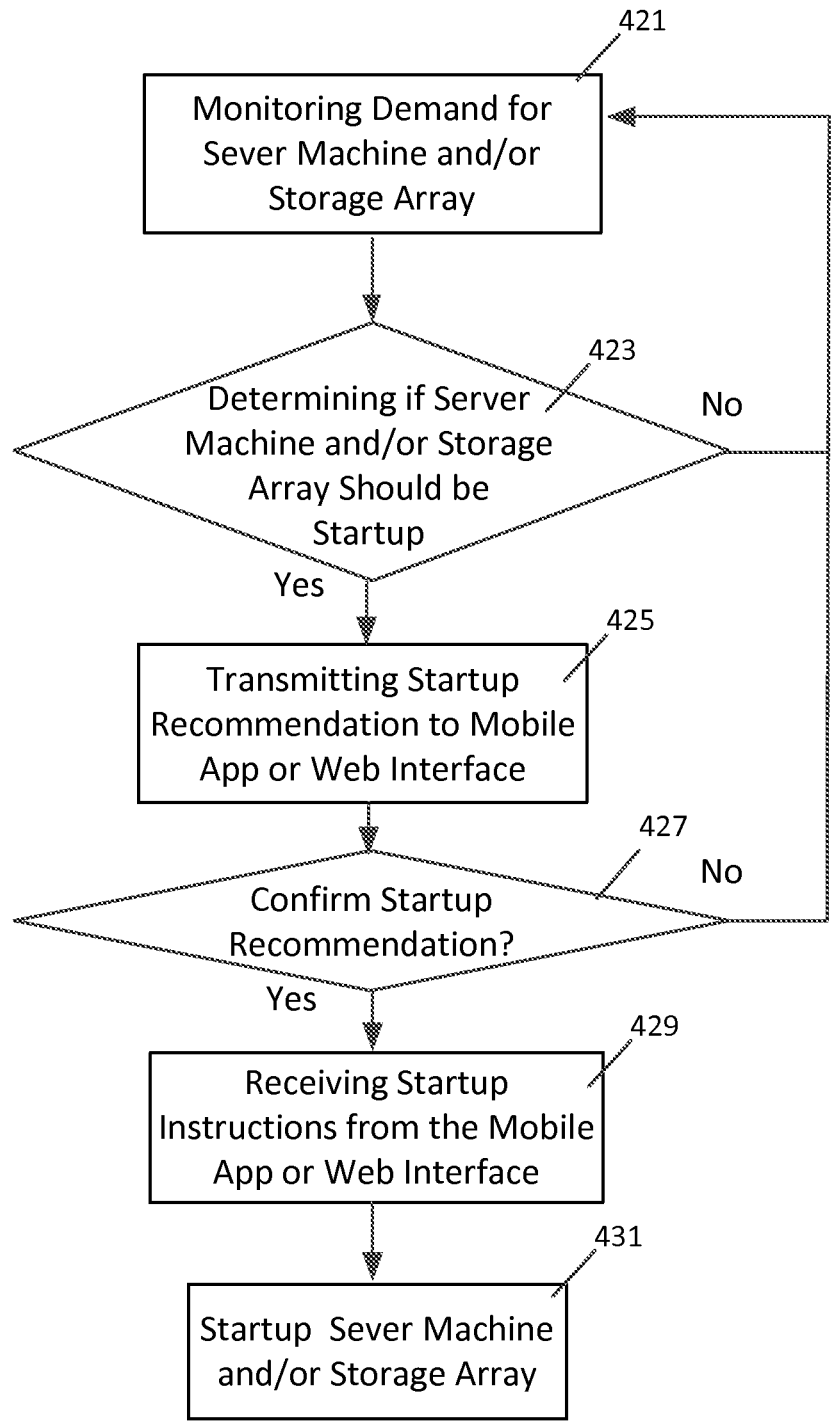
FIG. 5 illustrates a flowchart for an embodiment of a method for automatic demand detection and authorized startup of shutdown server machines and storage arrays.

As discussed above with reference to FIG. 3, the system may be able to automatically startup the shutdown server machines and/or storage arrays. With reference to FIG. 5, the centralized web server can receive and monitor idle information for the server machines and/or storage arrays from the agents 421. The centralized web server can determine if the server machines and/or storage arrays should be started up 423. In an embodiment, the startup demand can be based upon existing status and recent monitoring of the server machines and/or storage arrays that are not shutdown. For example, if there is no change in the idle status of the server machines and/or storage arrays, this can indicate that no additional machines are needed and the server machines and/or storage arrays that are shutdown should not be started up. The system can continue to monitor the demand for server machines and/or storage arrays 421.

If an increasing number of server machines and/or storage arrays are being switched from idle to active, this can indicate a trend towards more demand and the centralized web server may recommend that more server machines and/or storage arrays be started up. The centralized web server can transmit a startup recommendation to the mobile app or the secure centralized web interface 425. The system administrator can review the recommendation and any other information needed to authorize the startup of the shutdown server machines and/or storage arrays. Based upon this information, the system administrator can either confirm or deny the startup recommendation 411. If the system administrator does not confirm the startup, the system can continue to monitor the demand for server machines and/or storage arrays 421. Conversely, if the system administrator confirms the startup recommendation, the centralized web server can receive startup instructions from the mobile app or secure centralized web interface 429. The startup instructions can be applied to at least some of the server machines and/or storage arrays. In some embodiments, some of the server machines and/or storage arrays are not starter up. The centralized web server can transmit the startup instructions to the agents in the server machines. The agents can cause the instructed server machines and storage arrays to startup 431.

FIG. 5 is primarily directed towards systems that can allow remote startups of the server machines and/or storage arrays. However, in other embodiments the system may require a manual intervention for starting up the server machines and/or storage arrays. In these embodiments, the system can recommend starting up the server machines and/or storage arrays 425 and in response to this recommendation the system administrator can confirm the startup recommendation through the mobile app or secure centralized web interface 427. However, rather than receiving the startup instructions from the mobile app or secure centralized web interface, the system administrator may have to manually startup the server machines and/or storage arrays either personally or by instructing another person to perform this task.

Figure 6:
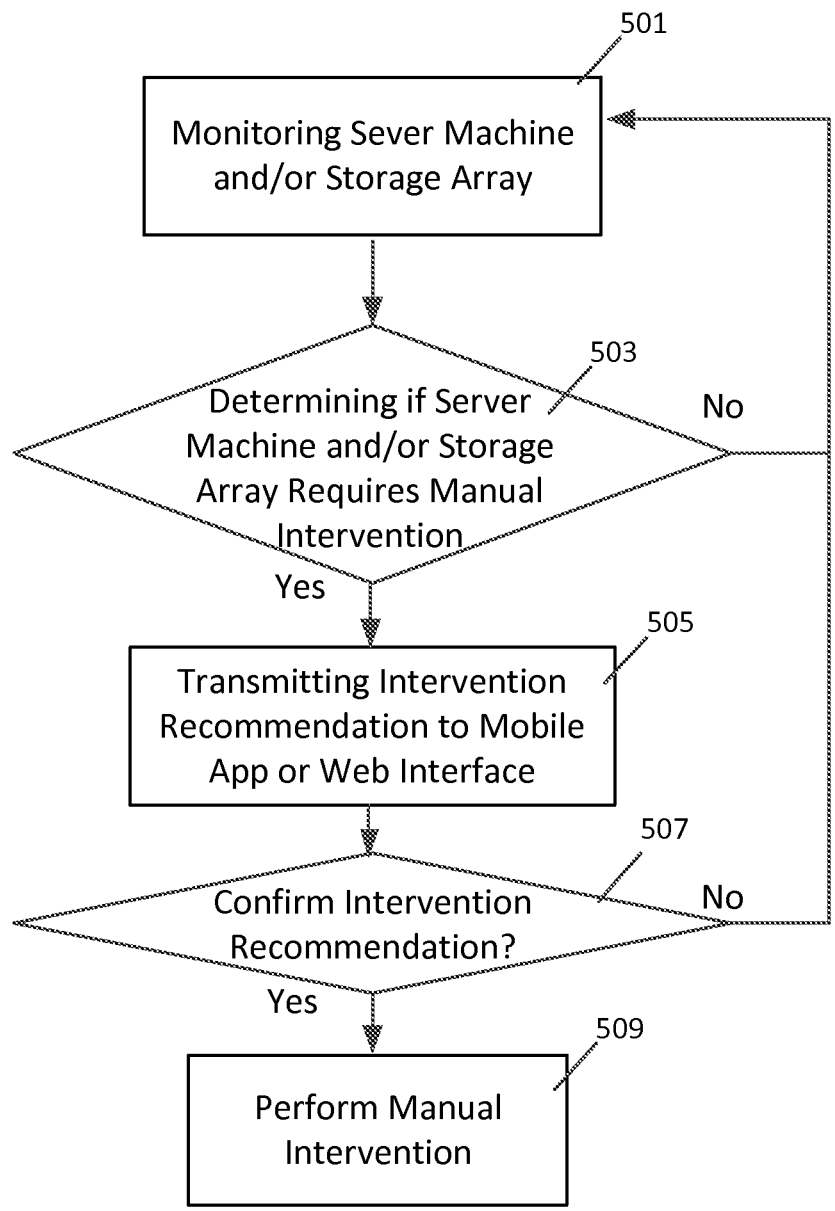
FIG. 6 illustrates a flowchart for an embodiment of a method for automatic diagnostic detection and manual intervention notification for server machines and storage arrays.

In an embodiment, the inventive system can also be used to inform a system administrator when manual intervention is recommended. With reference to FIG. 6, the centralized web server can monitor the operations of the server machines and/or storage arrays 501. The centralized web server can determine if the server machines and/or storage arrays require manual intervention 503. The need for manual intervention can be based upon diagnostics performed on the server machines and/or storage arrays. In some embodiments, the shutdown or startup of server machines and/or storage arrays can require manual intervention. If manual intervention is not required, the centralized web server can continue to monitor the server machines and/or storage arrays 501. If the centralized web server determines that manual intervention is required, the centralized web server can transmit a manual intervention recommendation to the mobile app 505. The system administrator can confirm or deny the intervention recommendation 507. If the intervention is not confirmed, the system can continue to monitor the server machines and/or storage arrays 501. If the intervention is confirmed, the system administrator can perform the specified manual intervention 509.

In an embodiment, the manual intervention can be the startup process which can be performed with reference to FIG. 6. The system can monitor the server machines and/or storage arrays 501 and determine if the server machines and/or storage arrays need to be started up through manual intervention 503. When a startup is required, the system can transmit a startup intervention recommendation to the mobile app, secure centralized web interface (or via any other electronic communications) 505. The system administrator can confirm the startup recommendation 507 and perform the startup manual intervention 509.

The inventive system can provide energy saving benefits by turning the servers and arrays on or off based upon the detected idle times as well as various other benefits. In an embodiment, the hardware systems that implement the present invention can convert traditional hardware systems into more eco friendly facilities. The described centralized monitoring server can provide centralized control and monitoring of the server and array hardware systems. This can allow a system administrator to more easily manage the server and array by providing automated and remotely controlled systems for shutting down and starting up the server machines and/or storage arrays.

The idle time information stored in the master database can be used to create historical data for idle time for the server and array hardware. This information can be used to determine the optimum times to shutdown and startup the servers and/or arrays. Based upon this information, a predicted idle and power down schedule can be developed that will maintain the required operational performance of the servers and arrays based upon the historical idle information while still shutting down when the servers and arrays are not needed.

In an embodiment, the energy and monetary savings can be calculated based upon the idle time information recorded on the master database. For example, if the power consumption rate is known for the server machines and storage arrays in both idle and shutdown modes, the system can calculate the amount of power saved by multiplying the difference in energy consumption between idle and shutdown by the duration of shutdown time. Although embodiments have been described with respect to optimization based on time factors, it should be noted that other factors may also be considered instead. The historic idle information can be expanded to measure and account for other factors, and a comparison of different shutdown and startup methods with regard to these factors can be presented to the user for comparison.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
providing a plurality of server machines each having an agent program and a server database;
providing a centralized monitoring server that communicates with the agent programs, the centralized monitoring server coupled to a master database;
detecting idle times for the plurality of server machines by the agent programs;
storing the idle times by the agent programs to the server databases;
receiving the idle times by the centralized monitoring server;
storing the idle times by the centralized monitoring server on the master database;
determining one or more of the plurality of server machines to power down based upon the idle times for the one or more of the plurality of server machines; and
upon the determination, transmitting, from the centralized monitoring server to the one or more server machines, a power off command, and startup instructions, the startup instructions comprising an instruction to enter an idle state after a manual startup;
notifying an administrator of a time when the manual startup is to be performed on the one or more server machines that have been powered down via the power off command,
wherein after the manual startup is performed by the administrator, the one or more server machines enter the idle state, according to the startup instructions, before becoming active for use by client computers.

2. The method of claim 1 further comprising:
storing power off times of the one or more of the plurality of server machines on the master database; and
calculating a power savings by the centralized monitoring server for the one or more of the plurality of server machines that have received the powering off command.

3. The method of claim 1 further comprising:
providing a mobile program running on a mobile device wherein the mobile device is in communication with the centralized monitoring server and the mobile device is associated with one or more of the plurality of server machines; and
transmitting a power off recommendation for the one or more of the plurality of server machines from the centralized monitoring server to the mobile program running on a mobile device.

4. The method of claim 3 further comprising:
receiving instructions to power off the one or more of the plurality of server machines by the centralized monitoring server; and
transmitting a power off command from the centralized monitoring server to the agent programs of the one or more of the plurality of server machines that received the power off command.

5. The method of claim 1 further comprising:
providing a mobile program running on a mobile device wherein the mobile device is in communication with the centralized monitoring server and the mobile device is associated with one or more of the plurality of server machines;
transmitting virtualization idle time information for the one or more of the plurality of server machines from the agent program to the mobile device; and
transmitting a power off command from the mobile program running on the mobile device to the one or more of the plurality of server machines.

6. The method of claim 1 further comprising:
providing storage arrays for the plurality of server machines;
probing the storage arrays by the centralized monitoring server;
obtaining idle time information for the storage arrays from one or more of the agent programs; and
storing the idle times of the storage arrays for the plurality of server machines on the master database.

7. A method comprising:
a processor-based system executed on a computer system and configured to:
providing a plurality of server machines each having an agent program and a server database;

providing a centralized monitoring server that communicates with the agent programs, the centralized monitoring server coupled to a master database;

detecting idle times for the plurality of server machines by the agent programs;

storing the idle times by the agent programs to the server databases;

receiving the idle times by the centralized monitoring server;

storing the idle times by the centralized monitoring server on the master database;

determining one or more of the plurality of server machines to power down based upon the idle times for the one or more of the plurality of server machines; and upon the determination, transmitting, from the centralized monitoring server to the one or more server machines, a power off command, and startup instructions, the startup instructions comprising an instruction to enter an idle state after a manual startup;

notifying an administrator of a time when the manual startup is to be performed on the one or more server machines that have been powered down via the power off command, wherein after the manual startup is performed by the administrator, the one or more server machines enter the idle state, according to the startup instructions, before becoming active for use by client computers.

8. The method of claim 7, the processor-based system further configured to:

storing power off times of the one or more of the plurality of server machines on the master database; and calculating a power savings by the centralized monitoring server for the one or more of the plurality of server machines that have received the powering off command.

9. The method of claim 7, the processor-based system further configured to:

providing a mobile program running on a mobile device wherein the mobile device is in communication with the centralized monitoring server and the mobile device is associated with one or more of the plurality of server machines; and transmitting a power off recommendation for the one or more of the plurality of server machines from the centralized monitoring server to the mobile program running on a mobile device.

10. The method of claim 9, the processor-based system further configured to:

receiving instructions to power off the one or more of the plurality of server machines by the centralized monitoring server; and transmitting a power off command from the centralized monitoring server to the agent programs of the one or more of the plurality of server machines that received the power off command.

11. The method of claim 7, the processor-based system further configured to:

providing a mobile program running on a mobile device wherein the mobile device is in communication with the centralized monitoring server and the mobile device is associated with one or more of the plurality of server machines;

transmitting virtualization idle time information for the one or more of the plurality of server machines from the agent program to the mobile device; and transmitting a power off command from the mobile program running on the mobile device to the one or more of the plurality of server machines.

12. The method of claim 7, the processor-based system further configured to:

providing storage arrays for the plurality of server machines;

probing the storage arrays by the centralized monitoring server;

obtaining idle time information for the storage arrays from one or more of the agent programs; and storing the idle times of the storage arrays for the plurality of server machines on the master database.

13. A computer program product, comprising a non-transitory computer-readable medium having a computer-readable program code embodied therein, the computer-readable program code adapted to be executed by one or more processors to implement a method comprising:

providing a plurality of server machines each having an agent program and a server database;

providing a centralized monitoring server that communicates with the agent programs, the centralized monitoring server coupled to a master database;

detecting idle times for the plurality of server machines by the agent programs;

storing the idle times by the agent programs to the server databases;

receiving the idle times by the centralized monitoring server;

storing the idle times by the centralized monitoring server on the master database;

determining one or more of the plurality of server machines to power down based upon the idle times for the one or more of the plurality of server machines; and upon the determination, transmitting, from the centralized monitoring server to the one or more server machines, a power off command, and startup instructions, the startup instructions comprising an instruction to enter an idle state after a manual startup;

notifying an administrator of a time when the manual startup is to be performed on the one or more server machines that have been powered down via the power off command, wherein after the manual startup is performed by the administrator, the one or more server machines enter the idle state, according to the startup instructions, before becoming active for use by client computers.

14. The computer program product of claim 13, the method further comprising:

storing power off times of the one or more of the plurality of server machines on the master database; and calculating a power savings by the centralized monitoring server for the one or more of the plurality of server machines that have received the powering off command.

15. The computer program product of claim 13, the method further comprising:

providing a mobile program running on a mobile device wherein the mobile device is in communication with the centralized monitoring server and the mobile device is associated with one or more of the plurality of server machines; and transmitting a power off recommendation for the one or more of the plurality of server machines from the centralized monitoring server to the mobile program running on a mobile device.

16. The computer program product of claim 15, the method further comprising:
- receiving instructions to power off the one or more of the plurality of server machines by the centralized monitoring server; and
- transmitting a power off command from the centralized monitoring server to the agent programs of the one or more of the plurality of server machines that received the power off command.

17. The computer program product of claim 13, the method further comprising:
- providing a mobile program running on a mobile device wherein the mobile device is in communication with the centralized monitoring server and the mobile device is associated with one or more of the plurality of server machines;
- transmitting virtualization idle time information for the one or more of the plurality of server machines from the agent program to the mobile device; and
- transmitting a power off command from the mobile program running on the mobile device to the one or more of the plurality of server machines.

\* \* \* \* \*